(12) United States Patent
Schwärzler

(10) Patent No.: US 6,254,043 B1
(45) Date of Patent: Jul. 3, 2001

(54) LOCKABLE STAND

(75) Inventor: Johannes-Gallus Schwärzler, Lauterach (AT)

(73) Assignee: Leica Geosystems AG (CH)

( * ) Notice: Subject to any disclaimer, the term of this patent is extended or adjusted under 35 U.S.C. 154(b) by 0 days.

(21) Appl. No.: 09/487,876

(22) Filed: Jan. 20, 2000

(30) Foreign Application Priority Data

Jan. 22, 1999 (EP) .................................................. 99101176

(51) Int. Cl.$^7$ .................................................. F16M 11/00
(52) U.S. Cl. .................................................. 248/163.1; 248/188.5; 248/170
(58) Field of Search .......................... 248/188.5, 163.1, 248/165, 440, 170

(56) References Cited

U.S. PATENT DOCUMENTS

| | | | | |
|---|---|---|---|---|
| 205,481 | * | 7/1878 | Gurley | 248/188.5 |
| 1,234,510 | * | 7/1917 | Trautwein | 248/171 |
| 3,963,207 | * | 6/1976 | Guasti | 248/168 |
| 4,767,090 | * | 8/1988 | Hartman et al. | 248/168 |
| 5,072,910 | * | 12/1991 | May | 248/412 |
| 5,222,705 | * | 6/1993 | Gibran et al. | 248/170 |
| 5,320,316 | * | 6/1994 | Baker | 248/163.1 |

FOREIGN PATENT DOCUMENTS

| | | |
|---|---|---|
| 412715 | 7/1924 | (DE) . |
| 2257355 * | 1/1993 | (GB) . |
| 09170925 | 6/1997 | (JP) . |

* cited by examiner

*Primary Examiner*—Anita M. King
*Assistant Examiner*—Holly N. Sy
(74) *Attorney, Agent, or Firm*—Rothwell, Figg, Ernst & Manbeck

(57) ABSTRACT

A lockable stand in order to be able to transport the stand. A central leg (2) is provided with a first support plate (26) and the other stand legs (3, 4) are provided with respective further support plates (36, 46) which are placed on the first support plate (26) of the central leg (2). Locking consist of pegs for locking the legs together are arranged on the support plates and coordinated holes or a strap of the central leg (2), in which the strap is fastened to a clamp fitting (25), engage one another. Locking of the legs in a retracted position is produced by means of a lock (27) arranged on the central leg (2). A manipulation of the stand by an operator can be performed in the upright position.

14 Claims, 9 Drawing Sheets

LOCKABLE STAND

BACKGROUND OF THE INVENTION

1. Field of the Invention

Figure 1:
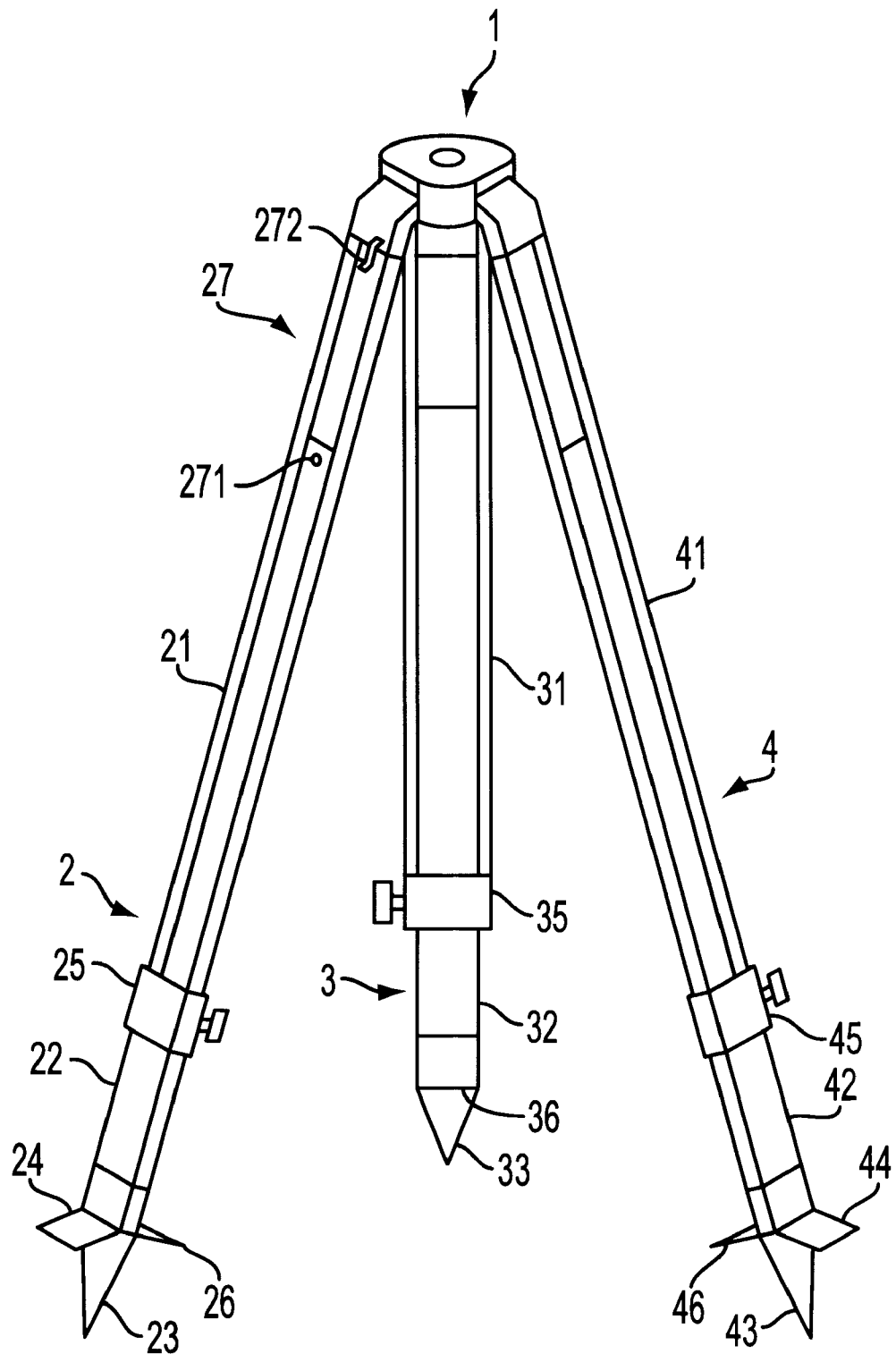

The invention relates to a stand comprising at least three legs, the upper part of which is fastened to the stand head in a hinged or tiltable manner and the lower part of which is telescopically displaceable in the upper part, locking means being provided for mutually locking the legs in the transport position of the stand.

2. Description of the Related Art

A conventional tripod stand, for example a stand of the GST 120-9 series of the Applicant, has locking means mounted on the legs for locking the latter to one another for transport and for securing them to prevent them from falling apart. The locking means comprise, on each leg, a hook mounted on the boot and a strap which is mounted on a clamp fitting through which the lower, displaceable part can be clamped in the upper stationary part of the leg. For locking, the clamp fittings are released and the hooks of each leg are inserted in succession over the strap of the adjacent leg. Thereafter, the legs are retracted and the clamp fittings are tightened, with the result that hook and strap engage one another and prevent the legs from falling apart. The locking means are identical on all three legs.

That all three clamp fittings have to be sufficiently firmly clamped is disadvantageous. The clamping screws of the clamp fittings are tightened or released when the legs are hooked one into the other. Moreover, owing to vibrations during transport, these screws might become loosened and might even become undone. Owing to the limited space in the transport position, the clamping screws may not exceed a maximum size, with the result that the tightening force to be applied is limited. The operation of the clamping screws is difficult particularly during surveying work on the ground in cold weather. In addition, an operator has to bend to reach the respective clamping screws of the clamp fittings.

If one of the clamp fittings disengages, there is the danger that a leg will be released; if a further clamp fitting becomes disengaged, all three legs would unfold.

BRIEF SUMMARY OF THE INVENTION

It is the object of the invention to provide a stand whose legs can be locked simply and in a user-friendly manner with high safety.

This object is achieved by a stand in which the features of the independent Claim are realized.

Advantageous or alternative embodiments are described by the features of the dependent Claims.

In contrast to the point-symmetrical arrangement of the locking means in conventional stands, the locking means of the invention lack point symmetry. After releasing the clamp fittings, the other legs of the stand are hooked in on a first, central leg of the stand. The legs are then retracted, it being necessary finally only to clamp the central leg in the retracted state. Consequently, all three legs are simultaneously secured to prevent falling apart and extensions.

The locking means comprise a first support plate on the central leg and further support plates on each of the other legs. In the embodiment of the invention, the support plate of the central leg may have projections, for example pegs, which are oriented upwards towards the head of the stand. The further support plates of the auxiliary legs have associated recesses, for example holes, which are placed on the pegs of the first support plate of the central leg.

Alternatively, however, the pegs can also comprise straps which are coordinated with the auxiliary legs. In alternative embodiments of the invention, pegs pointing downwards away from the head of the stand can be arranged on the further support plates of the auxiliary legs, which pegs are inserted into associated holes in the support plate of the central leg. In an alternative embodiment, the further support plates of the auxiliary legs may also have pegs pointing upwards towards the head of the stand. For locking, the auxiliary legs are swivelled inwards in order to place their support plates on the first support plate of the central leg. A strap fastened to the upper stationary section of the central leg, preferably to the clamp fitting, passes around the pegs when the stand legs are retracted.

In the context of the invention, "support plate" is to be understood as meaning inward-pointing attachments of any shape which engage one another when the stand is in the transport position.

The support plates are each fastened to the so-called boots of the stand legs or in the region thereof, which are mounted at the lower end of the displaceable part of the legs in order to place the stand legs on the ground. According to the invention, the support plates of the auxiliary legs are generally placed on the first support plate of the central leg, but it is also possible to provide measures which permit supportive retention of the further support plate by means of an appropriately formed spindle which is optionally coordinated with the clamp fitting of the central leg, extends through all support plates and fixes them in the vertical position. In the retracted state, pegs and holes or strap engage one another so that one or both auxiliary legs cannot slip out or fold open. Even if an auxiliary leg is released, the other auxiliary leg remains firmly locked.

The clamp fitting arranged at the lower end of the upper part of the central leg can be used for keeping the stand legs in the retracted position. Separate clamping of the auxiliary legs is not required. Advantageously, locking is used in combination or alternatively to this and begins at the upper ends of the two parts of the central leg, which ends point towards the stand head. For additional securing, the clamp fitting may also be clamped. Expediently, this locking takes place at discrete points. This may comprise, for example, a clamping spring with a recess which a peg engages. The clamping spring may be fastened to the upper end of the upper part of the central leg, and the peg to the upper end of the displaceable part of the central leg. In the retracted position, the clamping spring moves over the peg until the latter snaps into the recess. The two components of the locking means may also be conversely arranged by fastening the peg to the upper end of the upper part and the clamping spring to the upper end of the lower displaceable part of the central leg. Alternatively, instead of the clamping spring, it is also possible to provide a snap spring which—particularly when arranged on the inside of the central leg—engages a relatively large recess in the upper and of the lower part of the central leg. Advantageously, stops which damp the retraction movement and/or the extension movement of the lower parts of the legs and are optionally coordinated with the recess are provided. For locking the legs in the retracted state, it is no longer necessary for the operator to bend.

Such locking on all three legs in combination with the devices known per se for preventing the legs from swivelling out constitutes a particularly simple possibility for equipping existing stands. Thus, it would in principle not be necessary to provide support plates.

Expediently, a spacer is coordinated with the first support plate of the central leg so that, when the further support plates of the auxiliary legs are placed on the support plate of the central leg, the auxiliary legs are kept the required distance from the central leg. Mutual engagement of the pegs in the holes or the locking straps can therefore be performed rapidly and exactly. The spacer may be a bracket or a plastics member which is fastened to the first support plate of the central leg or optionally coordinated with the auxiliary legs.

BRIEF DESCRIPTION OF THE SEVERAL VIEWS OF THE DRAWING(S)

The invention is explained in more detail below with reference to the Figures shown in the drawing.

Figure 2A:
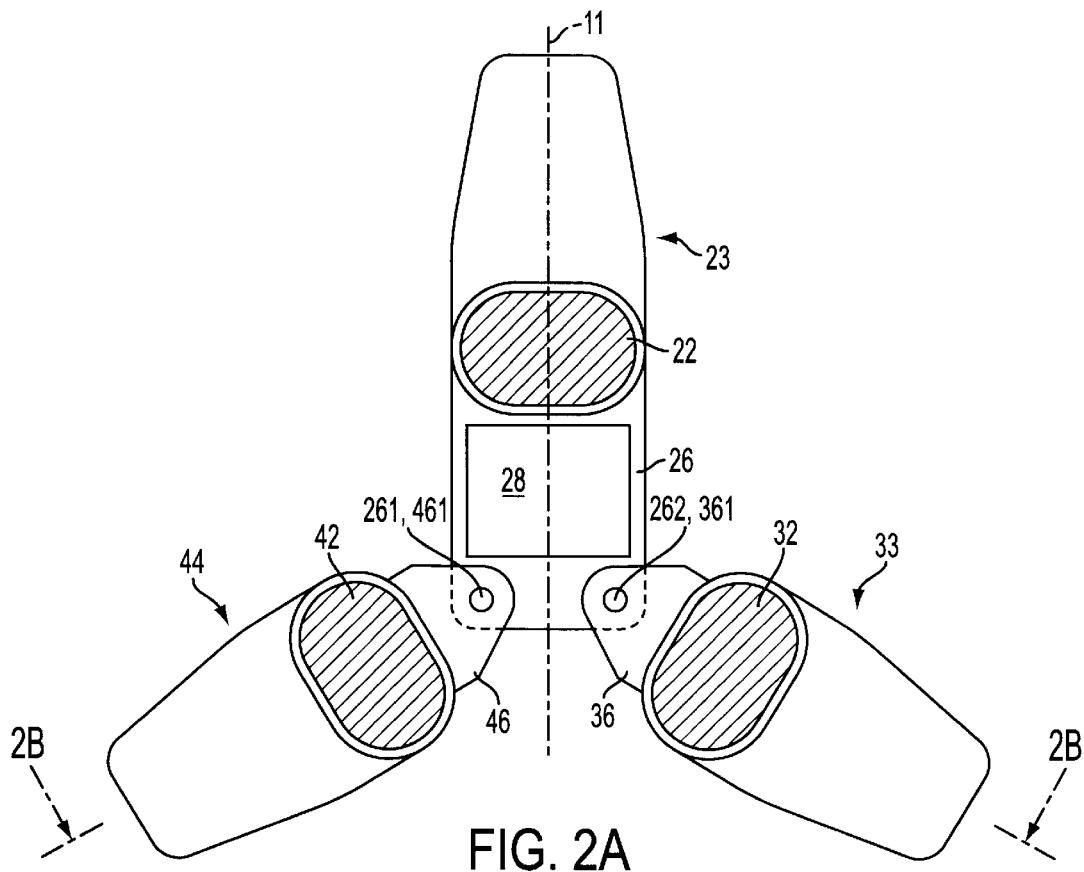
Figure 3A:
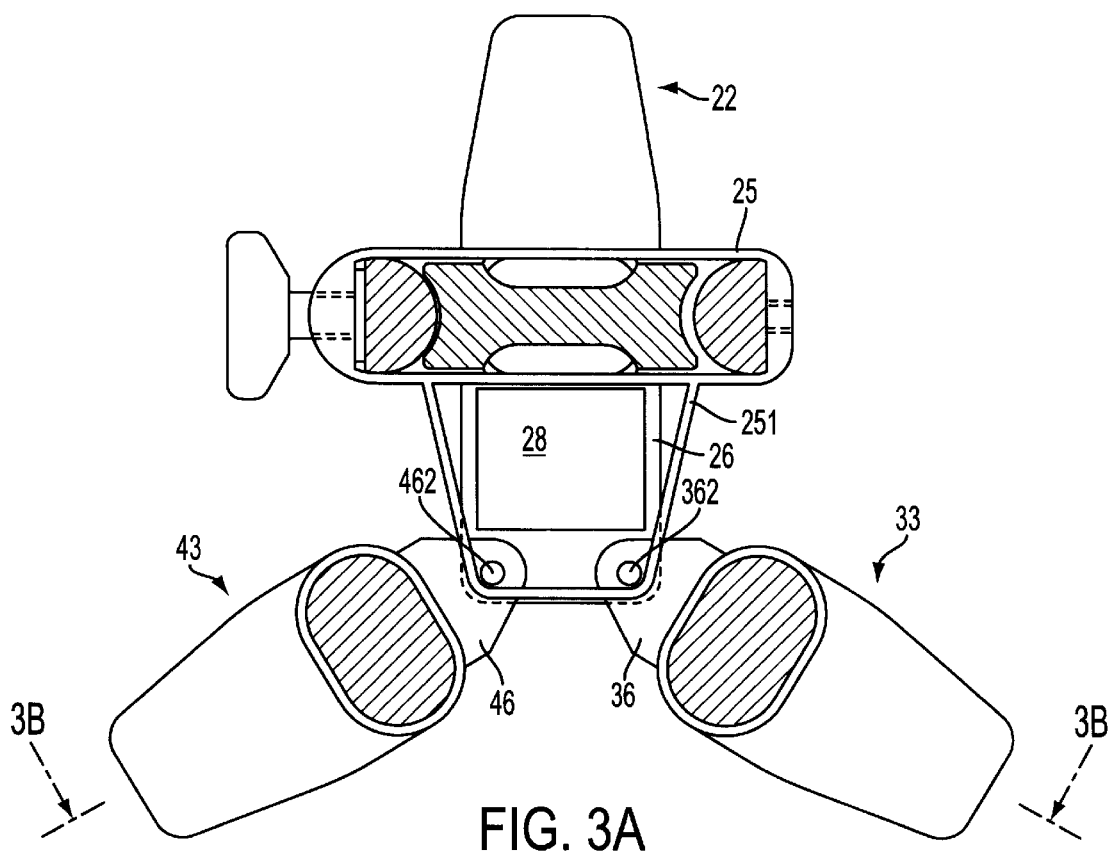
Figure 9B:
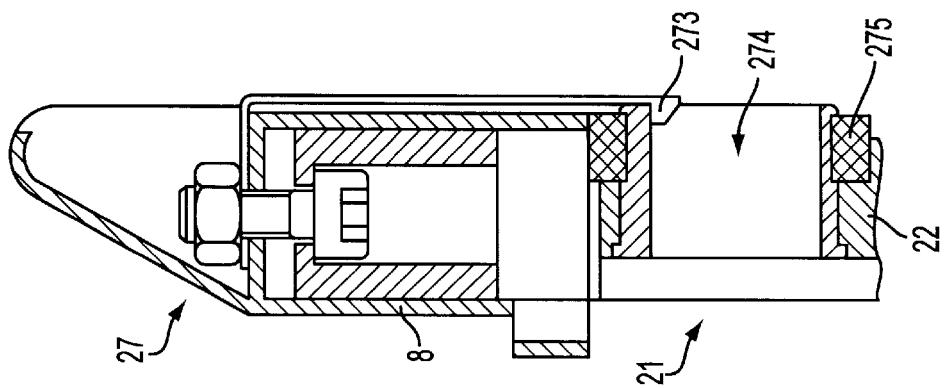
Figure 9A:
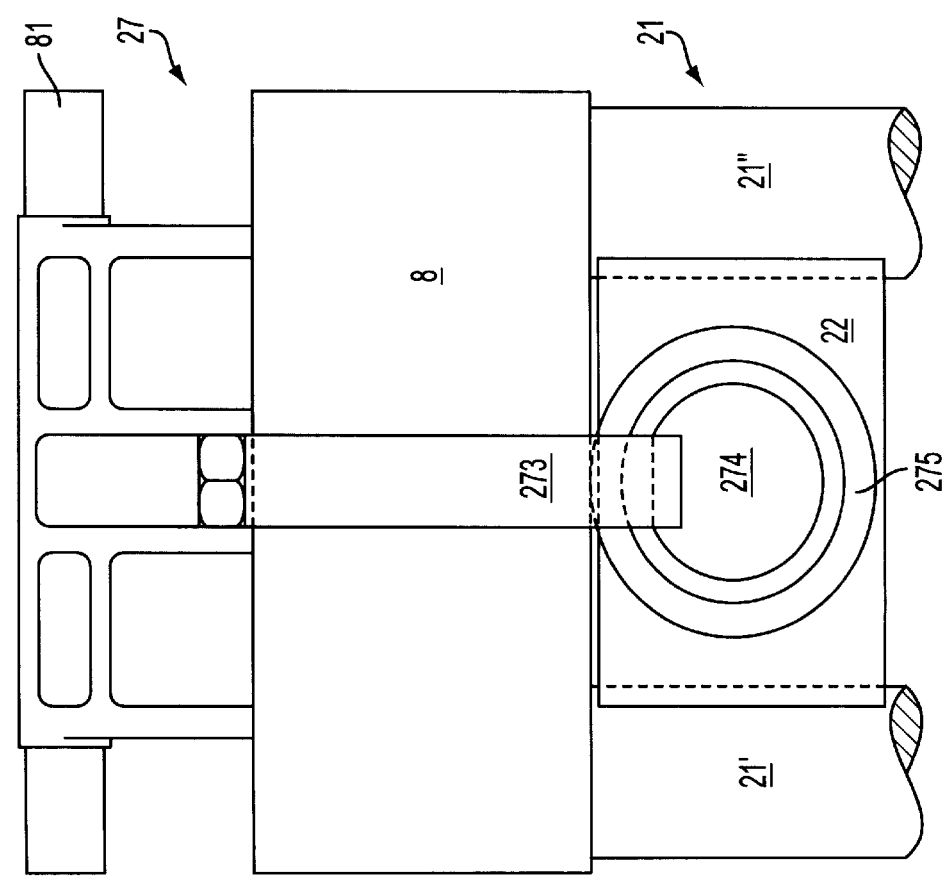

FIG. 1 shows a side view of a stand;

FIG. 2(a) and (b) show cross-sectional diagrams of a first embodiment of the locking means;

FIG. 3(a) and (b) show cross-sectional diagrams of a second embodiment of the locking means;

FIG. 4(a), 4(b) to FIG. 8(a), 8(b) show cross-sectional diagrams of further embodiments;

FIG. 9(a) and (b) show a view and a vertical section of the upper end of a stand leg with leg cap and locking means.

DETAILED DESCRIPTION OF THE INVENTION

FIG. 1 shows a tripod stand. Three legs 2, 3, 4 are pivotably fastened to a stand head 1. Each of the legs has an upper part 21, 31, 41, which in each case is rotatably fastened to the stand head 1. The upper parts 21, 31, 41 form a guide in which in each case a lower part 22, 32, 42 is arranged in a telescopically displaceable manner. So-called boots 23, 33, 43 which are placed on the ground start at the lower end of the lower parts 22, 32, 42. The boots have pointed ends and comprise a tread surface 24, 34, 44 so that the boot can be trodden into the ground by an operator.

When in use, the lower parts are drawn out of the upper parts of the stand leg up to a desired length and are fixed by means of a clamping device. A so-called clamp fitting 25, 35, 45 which is mounted on the lower end of the upper part of the respective stand leg and passes around the respective leg serves for clamping. By means of a tightening screw on the clamp fitting, lower and upper part of the leg are pressed against one another and form a frictional connection. A tripod can then be mounted on the stand head 1, oriented horizontally and prepared for receiving, for example, a geodetic instrument for surveying tasks.

For transporting the stand, the tightening screws of the clamp fittings 25, 35, 45 are loosened and the lower parts are pushed partly into the upper parts of the stand legs. The three stand legs are swivelled inwards, completely retracted and locked together. In the locked state, the lower parts of the stand legs are secured to prevent extension from the upper parts and also to prevent swivelling out about the axis of rotation located at the stand head. The locked stand can then be transported in a compact fashion.

Figure 2B:
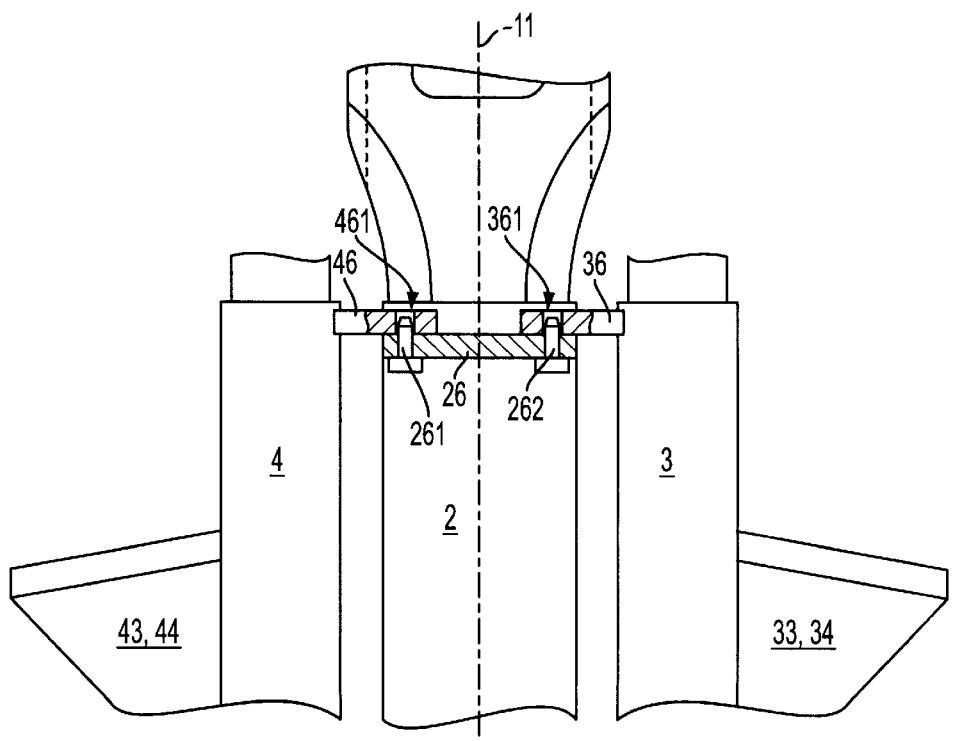

According to the invention, support plates 26, 36, 46 are fastened to or in the vicinity of each of the stand boots 23, 33, 43, for secure and userfriendly locking. The support plates 26, 36, 46 are located on those sides of the boots which are opposite the tread surfaces 24, 34, 44, i.e. the support plates are oriented in the direction of the centre of the stand, towards the respective other stand legs. Embodiments of the support plates are shown in detail in FIGS. 2 to 8. Corresponding elements are provided with identical reference symbols. In a first embodiment, FIG. 2(a) shows a horizontal cross-section through the stand legs after locking in the transport state; FIG. 2(b) shows a vertical section along the sectional line A—A of FIG. 2(a). A first support plate 26 of the stand leg 2 has two pegs 261, 262. The projecting ends of the pegs are oriented upwards in the direction of the stand head 1. Here, the first support plate is rectangular. The pegs 261, 262 are located in the region of those corners of the first support plate which face away from the lower part 22 of the stand leg 2. The first support plate is oriented perpendicular to the longitudinal direction of the lower part 22 of the stand leg 2. The further support plates 36, 46 on the boots 33, 43 of the stand legs 3, 4 each have holes 361 and 461, respectively, at the end. Holes and pegs are arranged relative to one another in such a way that, when the stand legs have been swivelled in, pegs 261, 262 engage the holes 461 and 361, respectively. The further support plates 36, 46 of the stand legs 3, 4 are formed identically to one another. In comparison, the first support plate 26 of the central leg 2 differs in shape and positioning on the boot. It is true that the locking means are symmetrical with respect to the axis 11 of symmetry. Point symmetry all round so that the locking means, as in the prior art, which would have been identical on all three legs is not present. The stand leg 2 is therefore referred to below as central leg and the other legs 3, 4 as auxiliary legs.

In order to establish the transport state starting from the operating position of the stand, shown in FIG. 1, the following manipulation is necessary. One of the clamp fittings of the auxiliary legs 3, 4, for example clamp fitting 35, is released so that the lower part 32 can be pushed into the upper part 31 of the auxiliary leg 3. The stand leg 3 is swivelled inwards towards the central leg 2. The lower part 32 is raised in order to place a further support plate 36 of an auxiliary leg on the support plate 26 of the central leg 2 and in order to place the hole 361 on the peg 262. The clamp fitting 45 of the auxiliary leg 4 is then released. In a corresponding manner, the hole 461 is placed on the peg 261. The clamp fittings 35, 45 remain loosened. The clamp fitting 25 of the central leg is then released. All lower parts 22, 32, 42 are retracted completely into the upper parts 21, 31, 41 of the stand legs. Finally, the lower part 22 of the central leg is also locked. For this purpose, it is expedient to provide locking means 27 at discrete points on the upper end of the central leg 2. This comprises a projection 271, which is mounted on the upper end of the lower part 22 of the central leg 2, and a spring clamp 272, which is fastened to the upper end of the upper part 21 of the central leg 2 and has a recess. The lower part 21 is retracted until the projection 271 snaps into the recess of the spring clamp 272. It is sufficient to lock the lower and upper part 22, 21 of the central leg 2 by means of the lock 27. Thus, the auxiliary legs 3, 4 must be simultaneously locked to prevent extension and swivelling out, since the respective pegs 261, 262 engage the holes 461 and 361, respectively. Optionally, the clamp fitting 25 can be tightened on the central leg in order to increase the security of the lock to prevent unintentional release of the locking means 27. The support plates are fastened relative to one another on the respective boots in such a way that, in the retracted state, the support plates 36, 46 of the auxiliary legs 3, 4 rest on the support plate 26 of the central leg 2 from above. The length of the lower parts 32, 42 of the auxiliary legs 3, 4 are such that they are completely retracted in the transport state, so that the respective support plates 36, 46 rest firmly on the support plate 26 of the central leg and pegs and holes engage one another securely. To put the stand into operation, the manipulations described above are in the reverse order.

In principle, snapping in the locking means 27 at the upper end of the central leg 2 is sufficient for secure locking. The locking and release of the locking means 27 can always be performed when the operator is upright. Since—apart from the optional clamping of the clamp fitting 25 for increasing the security of locking—the clamp fittings 25, 35, 45 need not be operated for establishing the transport state or for putting into operation again if the stand legs have been swivelled in, the respective clamping screws can be made larger. The operation of said screws is simpler and easier, especially in cold weather, since the torque is increased and the security against unintentional slipping in of a telescopic leg is increased.

Expediently, a spacer 28 is arranged on the first support plate 26 of the central leg. A bracket or a plastics block can be provided for this purpose. The spacer 28 prevents the auxiliary legs 3, 4 from swivelling in too low and collision of the first support plate 26 of the central leg with the auxiliary legs.

Instead of the arrangement of pegs and holes on the support plates, shown in FIG. 2(a) and 2(b), it is also possible to provide holes instead of pegs in the first support plate 26 of the central leg 2 and pegs instead of the holes in the further support plates of the auxiliary legs 3, 4. The latter pegs are then oriented downwards, i.e. away from the stand head in the direction of the holes. To establish the transport state, the auxiliary legs are swivelled in in succession and the pegs are inserted into the holes of the first support plate of the central leg. The other elements and the other manipulations correspond to the above embodiments.

Figure 3B:
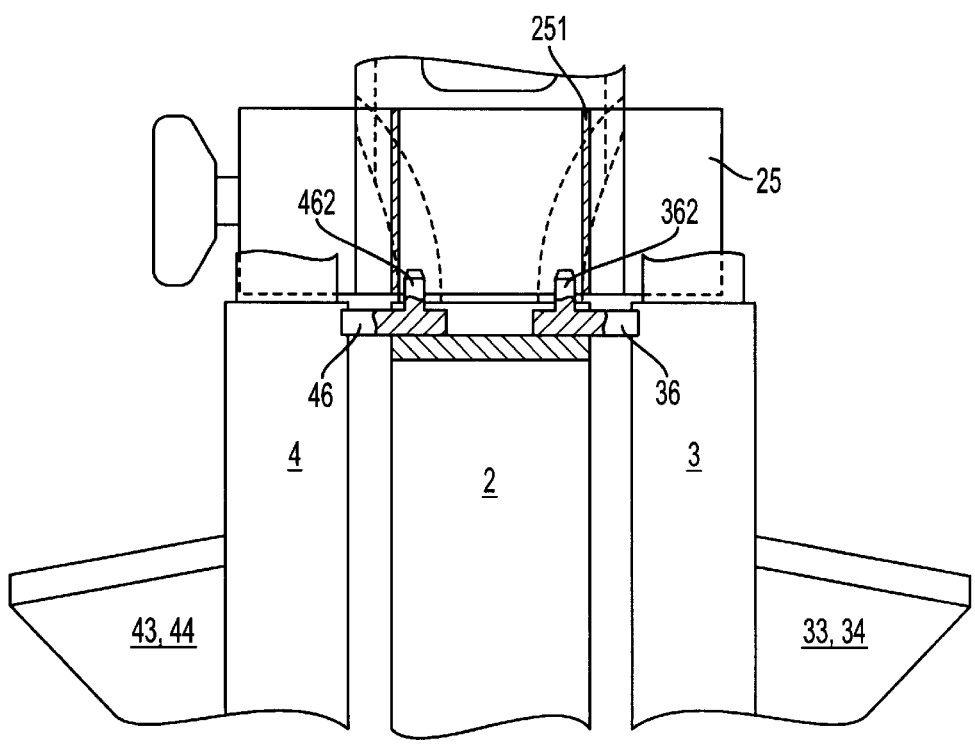

FIG. 3 shows an alternative embodiment of the locking means. FIG. 3(a) shows a horizontal cross-section through the stand legs in the transport state, the sectional plane being directly above the further support plates mounted on the boots in the case of the auxiliary legs 3, 4, while the sectional plane is at the height of the clamp fitting 25 in the case of the central leg 2. FIG. 3(b) shows a vertical cross-section along the sectional line B—-B of FIG. 3(a). In this embodiment, the first support plate 26 has neither holes nor pegs. The further support plates 36, 46 of the auxiliary legs rest on the first support plate 26. Respective pegs 362, 462 which point upwards, i.e. in the direction of the stand head 1, are formed on the further support plates 36, 46. In the transport state, a strap 251 passes around the pegs 362, 462. The strap 251 is fastened to the clamp fitting 25 of the central leg 2. Expediently, the locking strap 251 is an integral part of the clamp fitting 25 and consists of the same material. The locking strap 251 is directed away from the central leg 2 and surrounds an opening. In the embodiment shown, the strap is oriented perpendicular to the central leg.

For establishing the transport state, the auxiliary legs 3, 4 are swivelled in and their respective support plates 36, 46 are placed on the support plate 26 of the central leg. The spacer 28 keeps the stand legs 3, 4 a sufficient distance away from the central leg 2. After the clamp fitting 25 on the central leg 2 has been released, the locking strap 251 is passed over the pegs 362, 462. In the retracted position, the strap 251 is located above and a distance away from the support plate 26 of the central leg, so that the pegs 362, 462 on the other support plates are surrounded by the strap 251, the support plates 36, 46 being present between strap 251 and first support plate 26.

The embodiment shown in FIG. 3 can be combined with the embodiment described above in connection with FIG. 2.

FIGS. 4 to 8 show further embodiments for locking means, in each case in a horizontal section and a vertical section along the sectional line A—A of the horizontal section.

Figure 4A:
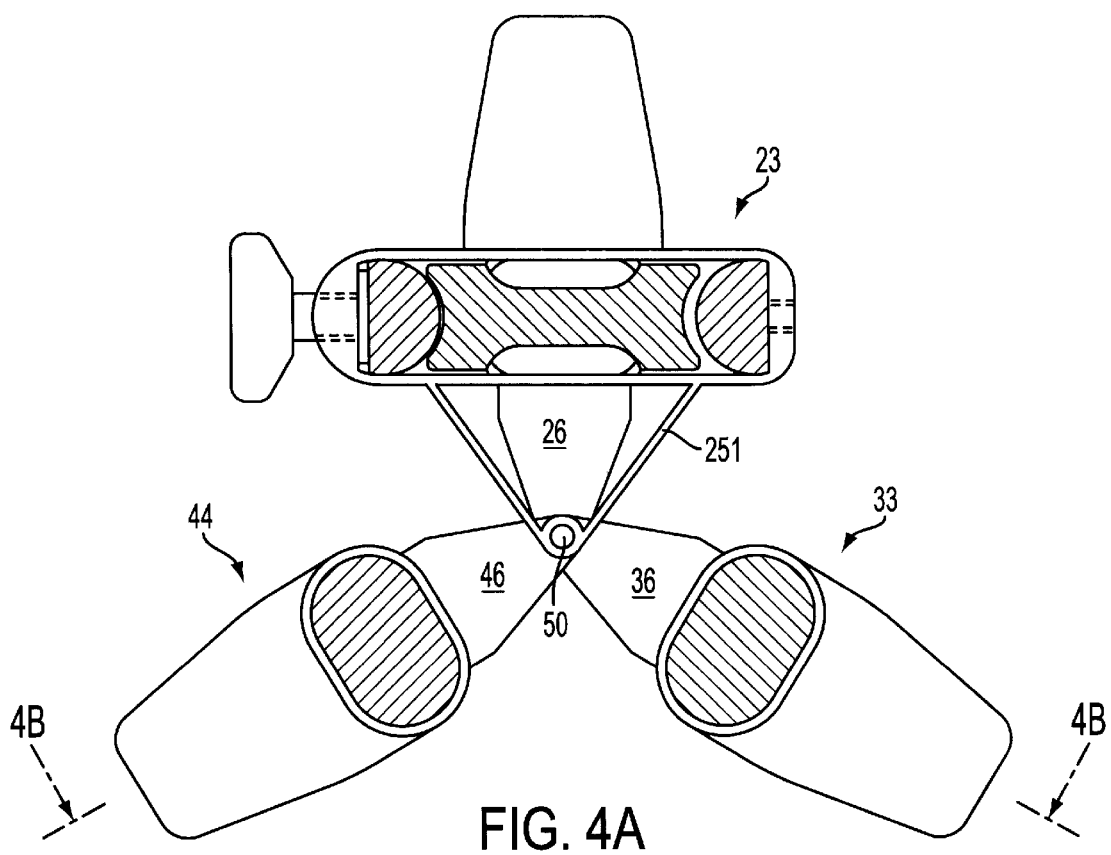
Figure 4B:
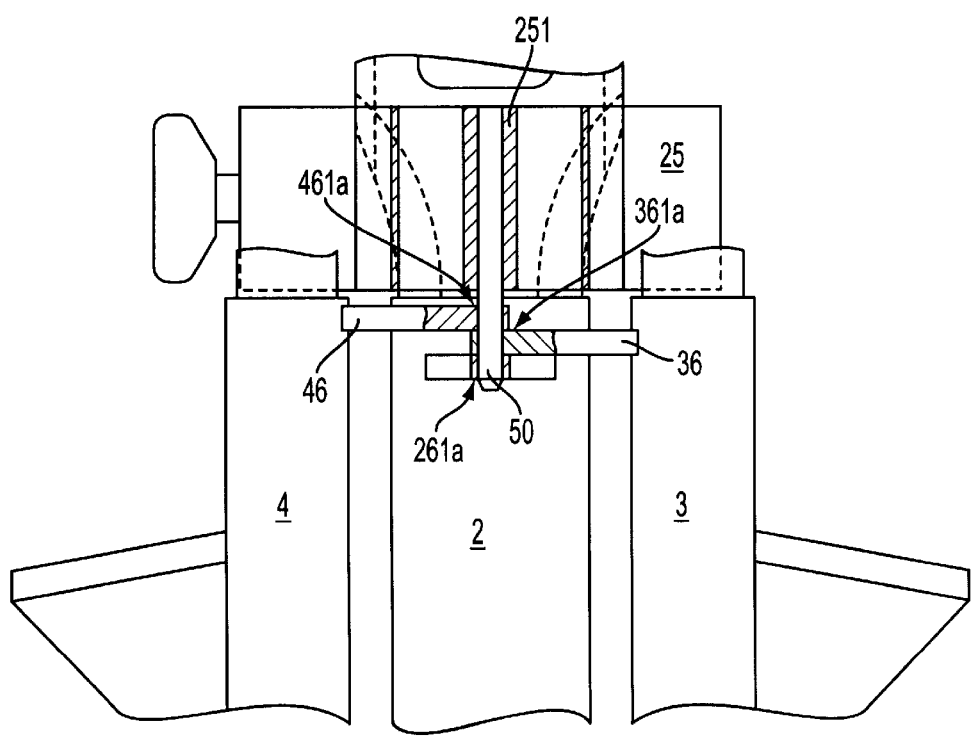

In FIG. 4(a) and (b), the clamp fitting 25 of the central leg 2 is provided with a locking strap 251 which carries a downward-projecting spindle 50 and, in the carrying position, passes through holes 261a, 361a and 461a which are provided in the first, lowermost support plate 26 of the central leg 2 and the further support plates 36 and 46 of the auxiliary legs 3 and 4.

Figure 5A:
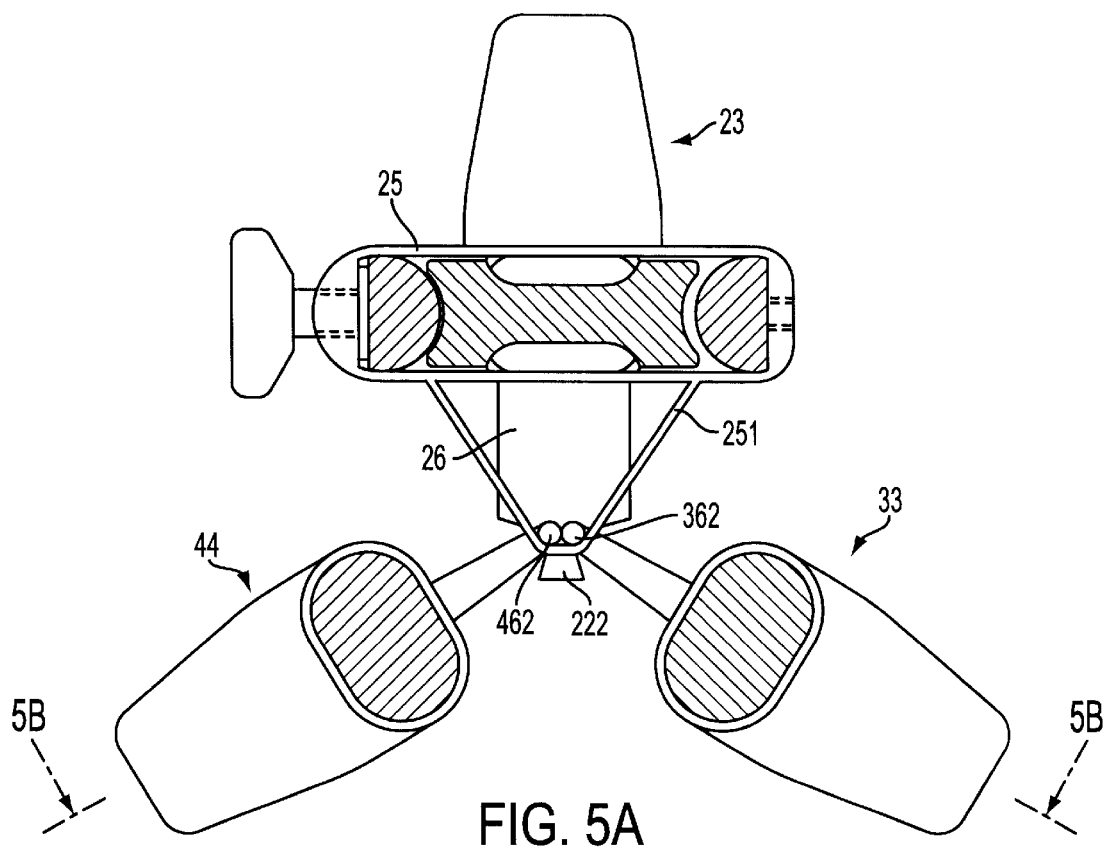
Figure 5B:
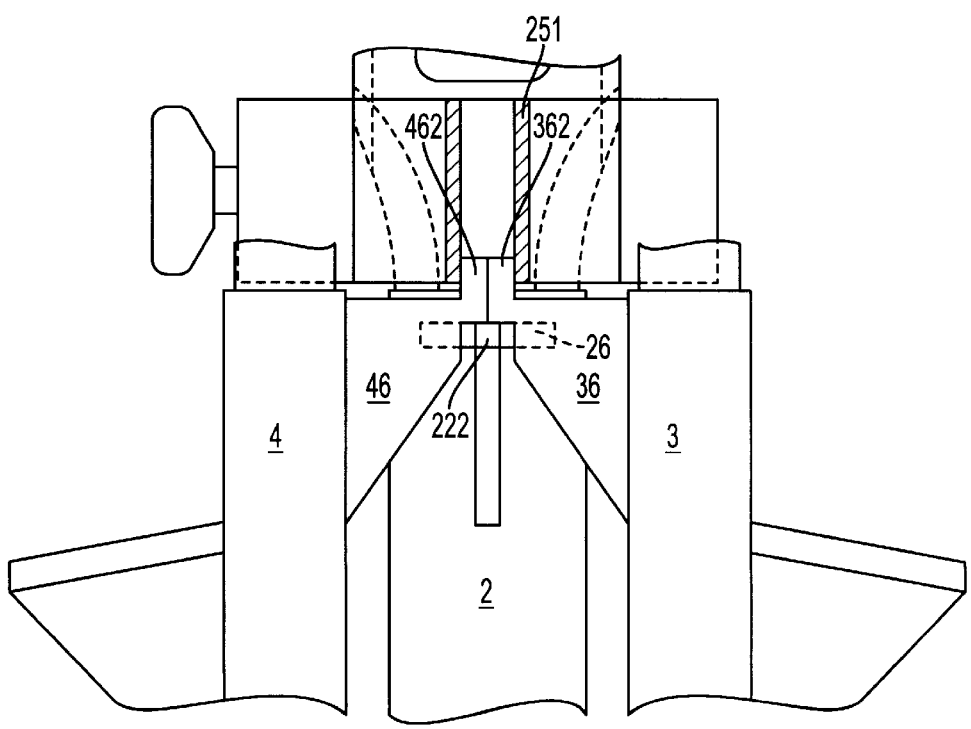
Figure 6A:
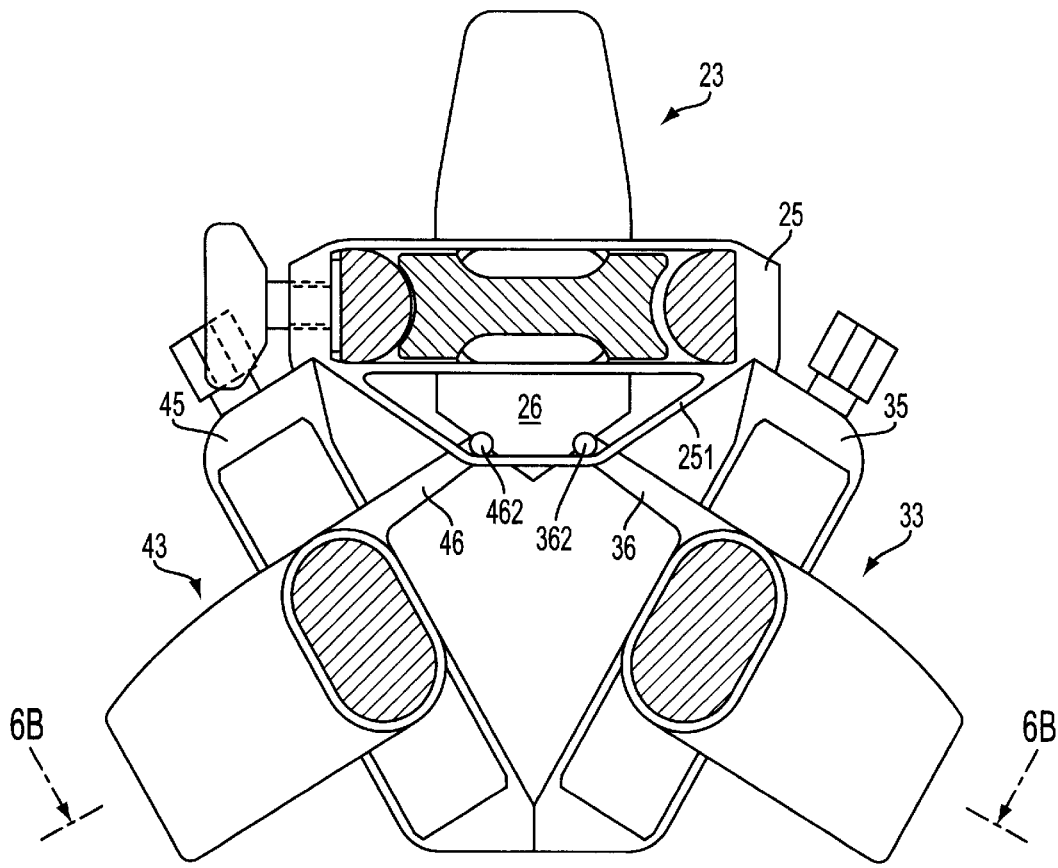
Figure 6B:
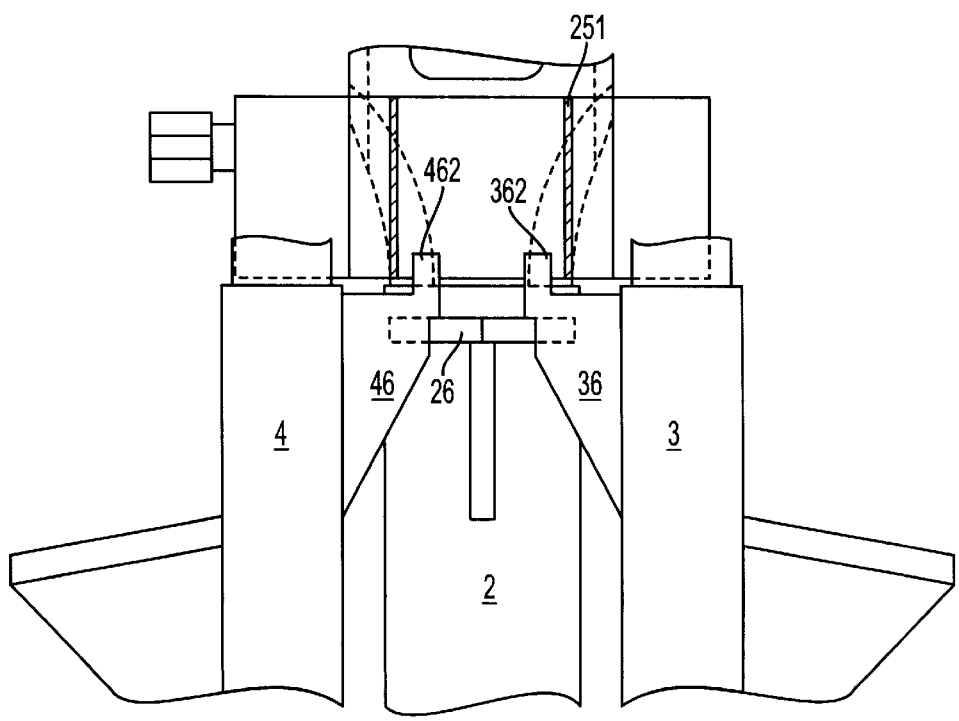
Figure 7A:
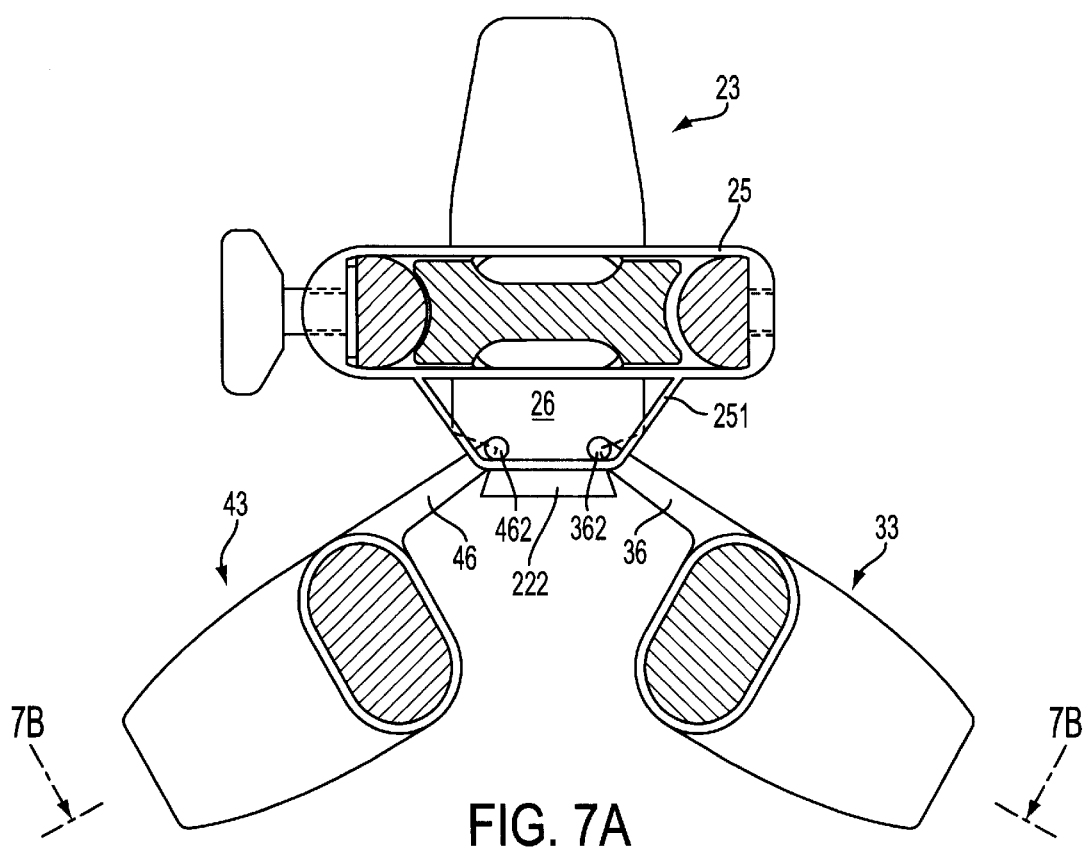
Figure 7B:
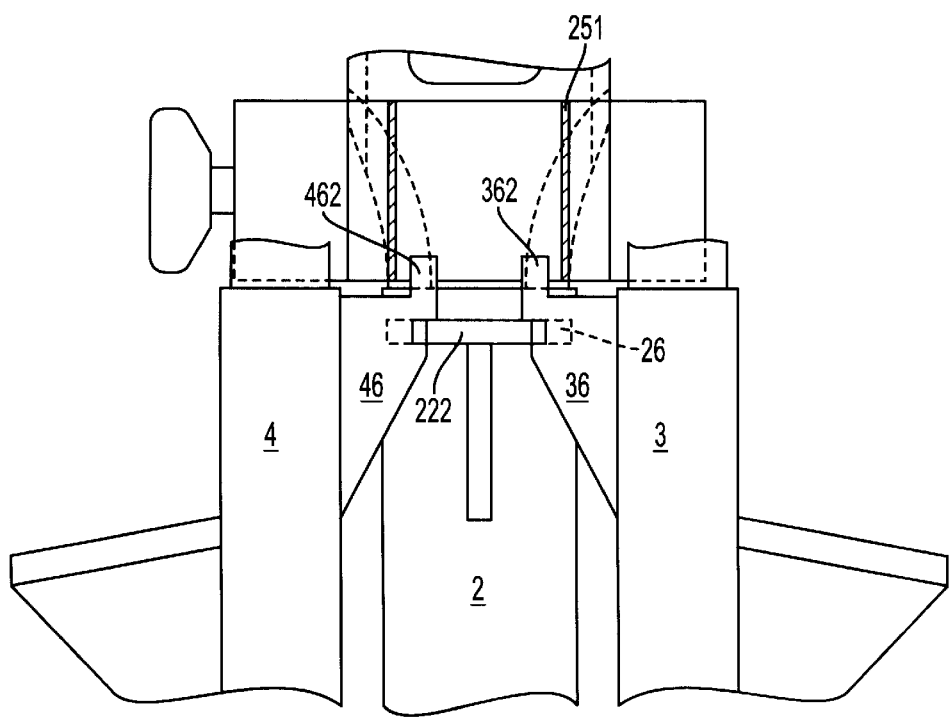
Figure 8A:
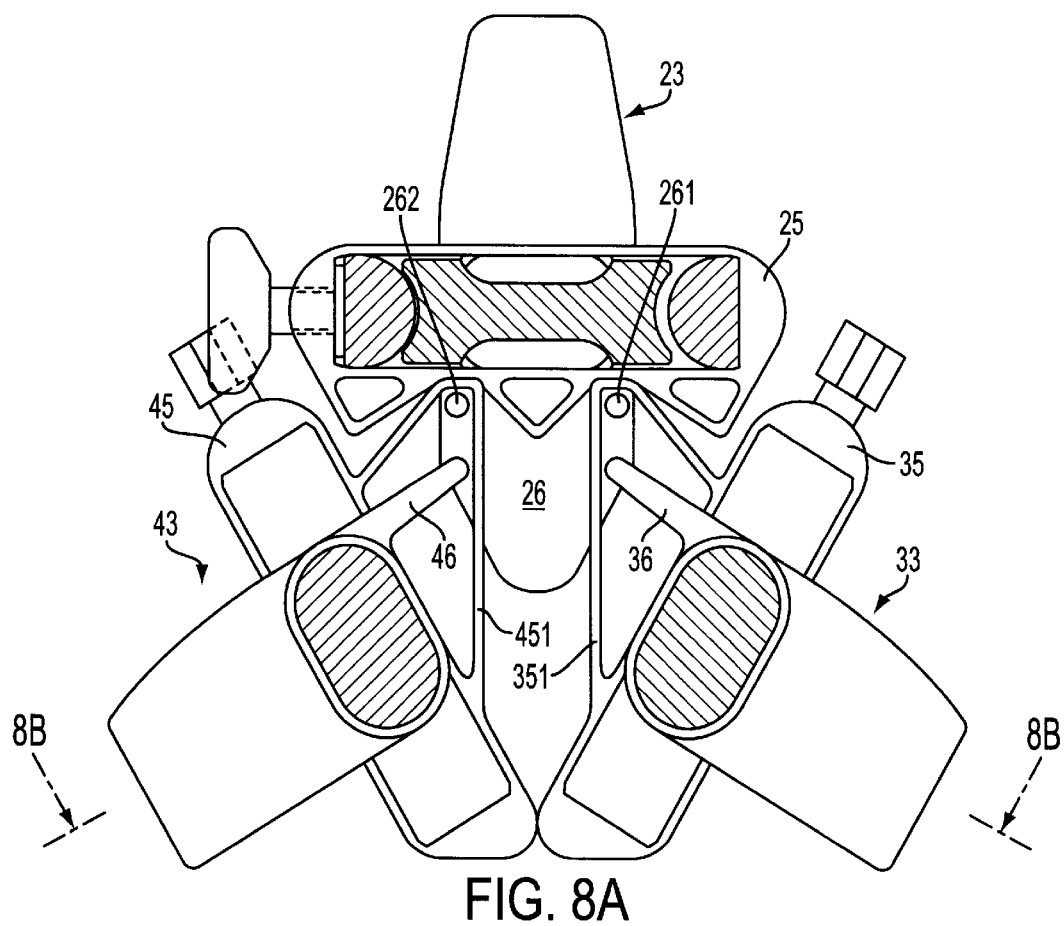
Figure 8B:
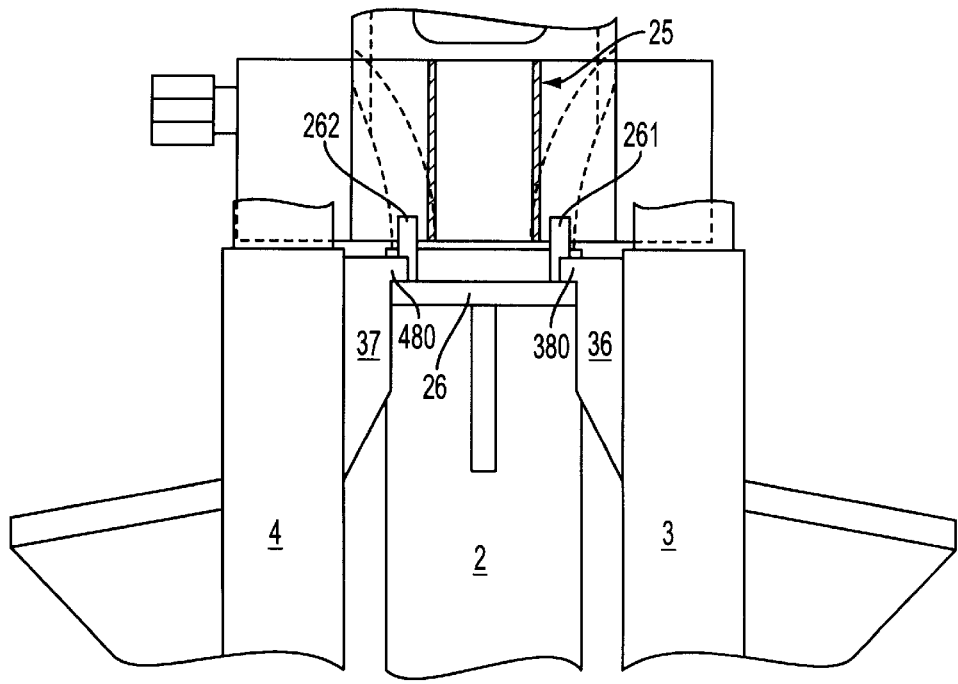

FIGS. 5 to 7 show similar embodiments, upward-projecting pegs 362 and 462 provided on the further support plates 36 and 46 of the auxiliary legs 3 and 4 projecting into the opening formed by the locking strap 251, with the result that the auxiliary legs 3 and 4 are secured to prevent them from falling apart in the transport position, while the vertical positioning of the auxiliary legs 3, 4 is secured by means of the first support plate 26 whose lug 222 interlocks in recesses in the further support plates—in particular on the lower side. The further support plates may be arranged centrally or off-centre in relation to the respective leg axis.

FIG. 8 shows a further embodiment in which—like that of FIG. 2—upward-pointing pegs 261, 262 are provided on the first support plate 26 and engage openings in locking straps 351, 451 which are provided on the clamp fittings 35 and 45 of the auxiliary legs 3 and 4. The further support plates 36 and 46 rest with projections 380 and 480 on the first support plate 26, thus securing to prevent the auxiliary legs from slipping out in the transport position, while securing to prevent undesired swivelling is achieved by means of pegs 261, 262 and locking straps 351, 451. The locking straps 351, 451 are formed in such a way that they simultaneously serve as a stop relative to the clamp fitting 25 of the central leg 2.

In the embodiment shown in FIG. 8—here the clamping screws of two clamp fittings are positioned essentially one on top of the other when the stand is in the transport position—the circular symmetry of the three legs is broken, similarly to the embodiment according to FIG. 6. The closed stand is formed to be relatively positionally stable for transporting horizontally in one position and—for example when transported in a vehicle—does not roll so easily.

FIG. 9(a) and 9(b) show a possibility for forming a locking means 27 as may be provided on the upper part 21 of the central leg 2. Of course—although a single such lock on the central leg 2 is sufficient as indicated above—it would also be possible additionally to provide such locks on the other two legs.

A leg cap 8 which is mounted in the stand head 1 so as to be pivotable about an axis 81 is provided on the upper end of the central leg 2—as also on the other legs 3 and 4. The leg cap 8 fits on the upper end of the upper part 21, which consists of two rodlike supports 21' and 21", between which the lower part 22 of the central leg is telescopically displaceable. In the transport position, the lower part 22 has been completely pushed into the upper part 21—and this situation is shown in FIG. 9(a) and (b).

Instead of the known spring clamp 272 of FIG. 1, in this case a snap spring 273 is provided which in contrast to the spring clamp 272—is arranged on the inside of the leg cap 8. This rules out the possibility of the spring unintentionally being released during any transport under rough conditions or when the stand is picked up. The spring clamp engages an opening 274 which is provided at the upper end of the lower part 22 and is kept sufficiently large for an operator's finger to pass through conveniently. Consequently, not only can any snap spring 273 be released but also the telescopic adjustment of the legs can be performed by the operator using one finger. A cushion which damps the impact of the lower part 21 against the leg cap 8 of the upper part 21 on retraction or against the clamp fitting 25 of the upper part 21 at maximum extension can be provided, for example, in the form of a rubber ring 275 arranged around this opening 274.

As a result of the invention, secure locking of the legs of a stand is permitted in a simple manner by preventing both radial swivelling out of the legs and vertical extension by means of a single lock. The lock can be operated by an operator in the upright position.

What is claimed is:

1. A stand comprising:
    at least three legs (2, 3, 4) which each have an upper part (21, 31, 41) which is pivotably fastened to a stand head (1) and a lower part (22, 32, 42) which is telescopically adjustable relative to the upper part (21, 31, 41),
    a first support plate (26) which is fastened to the lower part (21) of a first leg (2) of said at least three legs, and further support plates (36, 46) which are fastened to the lower part (32, 42) of each of the other legs of said at least three legs (3, 4), the further support plates (36, 46) engaging the first support plate (26) when the lower parts (22, 32, 42) of said at least three legs (2, 3, 4) have been retracted relative to the upper parts (21, 31, 41) in a retracted position.

2. A stand according to claim 1, wherein at least one locking means (27) fastened to the first leg (2) is provided, by which the locking means of lower part (22) of the first leg (2) can be fixed when retracted in the upper part (21) in the retracted position.

3. A stand according to claim 1, wherein the first support plate (26) has at least one projection (261, 262) directed towards the stand head (1), and at least one of the further support plates (36, 46) has a recess (461, 361) so that, in the retracted position, the projection (261, 262) engages the recess (461, 361).

4. A stand according to claim 1, wherein at least one of the further support plates (36, 46) has a projection directed away from the stand head (1), and the first support plate (26) has a recess so that, in the retracted position, the projection engages the recess.

5. A stand according to claim 1, wherein the further support plates (36, 46) have projections (462, 362) which are directed towards the stand head (1) and engage a strap (251) fastened to the upper part (21) of the first leg (2) in the retracted position.

6. A stand according to claim 5, wherein the strap (251) encloses an opening and is directed away from the first leg (2), the strap (251) being fastened to a lower end of the upper part (21) of the first leg (2) and, in the retracted position, being arranged above the first support plate (26) such that the projections (362, 462) of the further support plates (36, 46) engage the opening enclosed by the strap (251).

7. A stand according to claim 3, wherein said at least one projection (261, 262) is a peg, and the recess (461, 361) is a hole arranged in said at least one of the further support plates.

8. A stand according to claim 2, wherein the locking means (27) is mounted on those ends of the leg (2) which upper part (21) and the lower part (22) of the first leg which are closest to the stand head (1).

9. A stand according to claim 8, wherein the locking means (27) comprises a spring clamp (272) with a recess and a projection (271) which engage one another when the lower part (22) of the first leg has been retracted into the upper part (21) of the first leg, and that in particular the spring clamp (272) is arranged on the upper part (21) of the first leg (2) and the projection (271) is on the lower part (22) of the first leg.

10. A stand according to claim 1, wherein the lower parts (22, 32, 42) of said at least three legs (2, 3, 4) each have boots (23, 33, 43) for placing on the ground, and the support plates (26, 36, 46) are arranged in the region of the boots (23, 33, 43).

11. A stand according to claim 1, further comprising a spacer (28) disposed on the first support plate (26) by which the further support plates (36, 46) are kept a distance away from the lower part (22) of the first leg (2) when the lower parts (22, 32, 42) of said at least three legs (2, 3, 4) have been retracted relative to the upper parts (21, 31, 41) of said at least three legs (2, 3, 4).

12. A stand according to claim 1, wherein the locking means (27) are fastened to the first leg (2), and to the other legs said at least three legs (3, 4), by which the locking means of the lower part (22) of the first leg (2) and the lower parts (32, 42) of each of the legs of said at least three legs (3, 4) can be fixed when refracted in the respective upper parts (21, 31, 41) of said at least three legs (2, 3, 4) in the retracted position.

13. A stand according to claim 1, wherein at least one of the further support plates (36, 46) has a projection directed away from the stand head (1), and the first support plate (26) and the other of the further support plates have recesses so that, in the retracted position, the projections engage the recesses.

14. A stand according to claim 8, wherein the locking means (27) comprises a snap spring (273) and opening (274) which engage one another when the lower part (22) of the first leg has been retracted into the upper part (21) of the first leg and that in particular the snap spring (273) is arranged on the upper part (21) of the first leg (2) and the opening (274) on the lower part (22) of the first leg.

\* \* \* \* \*